United States Patent [19]
Gilcher

[11] 4,200,855
[45] Apr. 29, 1980

[54] BOLT-LIKE RAILWAY VEHICLE WHEEL DETECTOR

[75] Inventor: Heinz Gilcher, Export, Pa.

[73] Assignee: Westinghouse Air Brake Company, Swissvale, Pa.

[21] Appl. No.: 911,618

[22] Filed: Jun. 1, 1978

[51] Int. Cl.² ............................................. G01L 1/22
[52] U.S. Cl. ....................................... 338/5; 246/249; 338/2
[58] Field of Search ............... 338/2, 5, 47; 73/141 A, 73/88.5 R, 88.5 SD, 146; 246/249, 251; 177/163, 211, DIG. 8

[56] References Cited
U.S. PATENT DOCUMENTS 3,009,056  11/1961  Bone et al. .......................... 338/2 X
3,577,112  5/1971  Bowen et al. ........................ 338/5 X Primary Examiner—C. L. Albritton
Attorney, Agent, or Firm—J. B. Sotak; R. W. McIntire, Jr.

[57] ABSTRACT

A railway car wheel detection arrangement employing a pair of bolt-like sensor units which are spaced apart a given distance and are fastened to holes formed in the web portion of the track rail. Each of the sensor units includes an oblong aperture having a planar surface to which is secured a strain gage element. The strain gage element is tension stressed under the load of a wheel of a railway car to vary its resistance value which results in the unbalancing of a bridge network to produce a signal signifying the presence of a car wheel.

10 Claims, 7 Drawing Figures

SOUTH TRAVEL

NORTH TRAVEL

BOLT-LIKE RAILWAY VEHICLE WHEEL DETECTOR

FIELD OF THE INVENTION

This invention relates to a railway vehicle wheel sensor for railway vehicles and, more particularly, to a strain gage wheel detecting arrangement employing at least one bolt-like element attached to the web of the running rail for detecting the presence of a wheel of a vehicle by sensing the amount of loading on the head of the running rail.

BACKGROUND OF THE INVENTION

In certain railroad operations, such as, in the separation and sorting of incoming trains in a classification yard, it is necessary to detect the presence of railway cars at various locations along their route of travel to the selected class tracks. For example, in an automatic humping operation, it is common practice to employ frictional braking apparatus or car retarders for controlling the speed of the freely-moving vehicles in order to ensure that the vehicles safely reach their destination and/or properly couple with other vehicles standing in the appropriate class track. In order to apply the appropriate braking force to the sides of the passing wheels, it is indispensable to detect and determine when a railway vehicle is within the confines of the car retarding assembly. While numerous types of wheel detectors have operated satisfactorily in certain installations, it has been found that these previous wheel detectors are not suitable for car retarder applications. For example, many of the prior art detectors are relatively large and bulky, and therefore, they do not lend themselves to the confined quarters and limited amount of space which is available in a retarder installation. That is, the use of conventional wheel detectors in a frictional-gripping type car retarder is not plausible since the clearance requirements cannot be met so that proper operation of the retarder is not possible. In addition, the previous wheel detectors were susceptible to damage and even destruction by automatic ballast cleaning and tamping equipment as well as by dragging equipment. Further, magnetic types of car detectors are adversely effected by the great amount of iron and steel that make up the massive retarders. In one case, it was proposed to drill holes in the top of the head of the running rails and to insert and cement magnetic coils therein to detect the passing wheels of moving railway vehicles. However, this proposal was not acceptable in that the drilled hole weakened the rails and could lead to fatigue and cracks and eventual failure of the running rails. In addition, the extreme vibrations, pounding, as well as the thermal expansion and contraction of the rail adversely effects the operation of conventional types of magnetic, mechanical and light-responsive types of wheel detectors in a railway car retarder installation.

OBJECTS OF THE INVENTION

Accordingly, it is an object of this invention to provide a new and improved wheel detector for railway vehicles.

Another object of this invention is to provide a novel wheel sensing device which is relatively small and compact and fits under the head of the track rail.

A further object of this invention is to provide a unique strain gage wheel detecting device which is fixedly secured to the web of a running rail.

Still another object of this invention is to provide an improved bolt-type of a wheel sensor which detects the passing wheels of railway cars by detecting the force exerted on the head of a running rail.

Still a further object of this invention is to provide a bolt-type of strain gage wheel detector which is mounted to the web portion of a track rail to sense a change in the load on the track rail due to the presence of a railway vehicle.

Yet another object of this invention is to provide a boltlike pressure sensitive detector for detecting the wheel of a passing vehicle by sensing an increase in the load pressure.

Yet a further object of this invention is to provide a unique detecting device for sensing the passage of moving objects comprising a bolt-like member having an elongated cavity, an upper planar surface formed therein, a strain gage member including a resistance element bonded to an insulative tab member or glass chip which is cemented to the upper planar surface, a support structure for supporting the moving objects, the bolt-like member fixedly attached at the neutral axis of the support structure for causing the strain gage member to detect the strain which is exerted on the support structure under the load of passing objects.

An additional object of this invention is to provide a new and improved railway car wheel detector arrangement which is simple in design, economical in cost, reliable in operation, durable in service, dependable in performance and efficient in use.

SUMMARY OF THE INVENTION

In accordance with the present invention, there is proved a new and unique wheel detecting arrangement for sensing the presence of the wheels of railway vehicles. The wheel detector includes a pair of bolt-like sensor members spaced apart a given distance and securely attached to the track rail. Each of the sensor members includes an elongated cylindrical body which is externally threaded at one end. Each of the cylindrical sensor bodies includes an oblong cavity having an upper and lower planar surface. A strain gage member includes a resistive element which is bonded to a miniature insulative tab or glass chip. The tab or chip is disposed within the oblong cavity and is cemented to the upper planar surface. A pair of output conductive leads which are connected to the respective ends of each of the strain gage resistive elements are fed through a passageway which communicates with the oblong cavity. The cavity is filled with a RTV material to protect the strain gage element from dirt, dust, moisture and other contaminants. Each bolt-like sensor is fitted into a mating tapered hole formed in the web portion of the track rail at its neutral axis and is snugly secured by a nut and washer. The free end of the bolt-like member is provided with an indexing mark for aligning the resistive sensing element in line with the vertical axis of the track rail. The free ends of each of the bolt-like members includes a threaded hole for receiving a machine screw which is used to attach a protective cover over the ouside of the track rail. A terminal block is attached to the inside of the cover and is adapted to receive the free ends of the two pairs of conductive leads. A heavy duty cable connects the resistive elements to the respective arms of a bridge network. When the wheel of a railway vehicle passes over the sensor member, the deflection of the track rail places the strain gage element in tension so that resistance value of the resistive element varies and causes an unbalance of the bridge network. The unbalancing of the bridge network occurs as the wheel passes over each sensor so that the change in resistance will indicate the presence of a railway vehicle. The use of a pair of strain gage resistive elements in a bridge results in a differential action which nulls out or balances out the effects of expansion and contraction of the track rail and thermal drift of the strain gage elements as well as moment induced strains and impact caused on flat spots on the wheels of passing vehicles.

BRIEF DESCRIPTION OF THE DRAWINGS

Other objects, features and advantages of the present invention will become more readily apparent from the following detailed description of the preferred embodiment when read with reference to and considered in conjunction with the accompanying drawings which form part of this disclosure, in which.

DETAILED DESCRIPTION OF THE INVENTION

Figure 1:
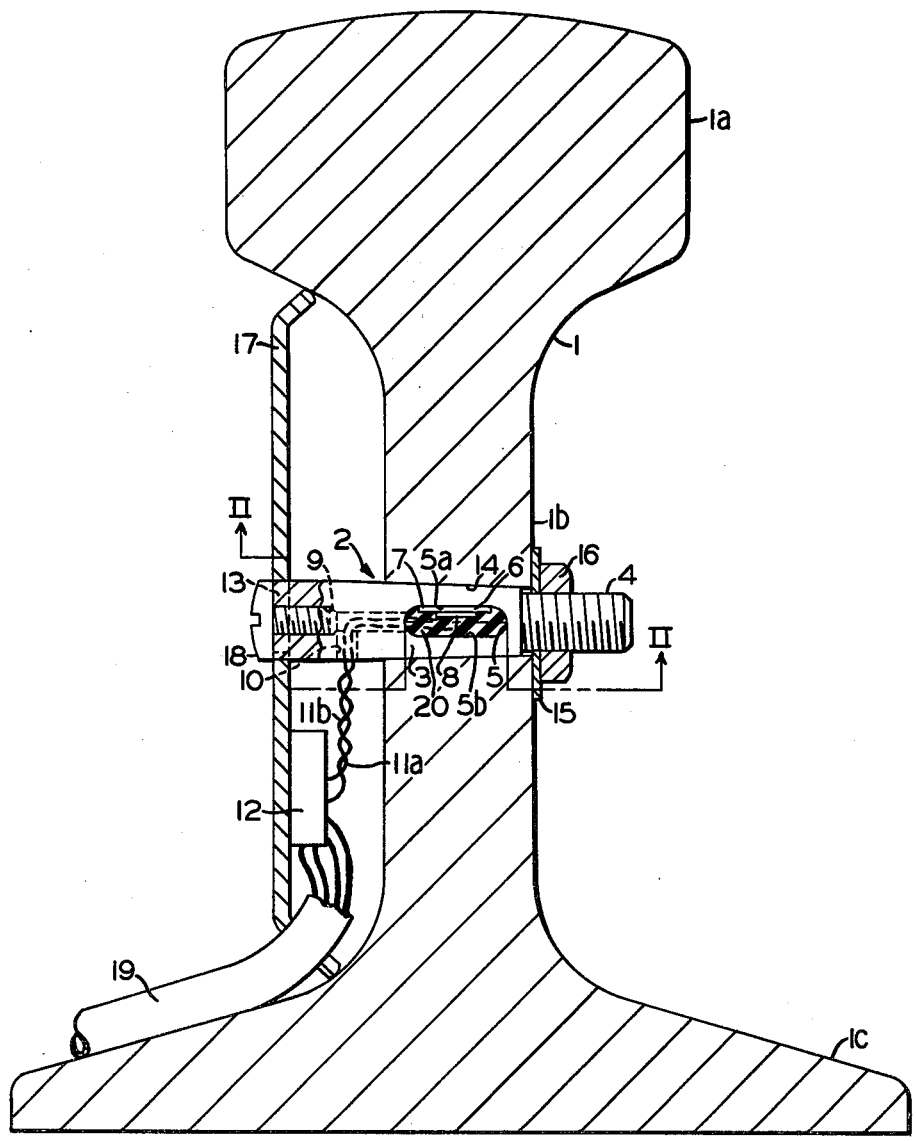
FIG. 1 is a partial vertical sectional view of a strain gage sensor or transducer unit, showing the unit mounted to a track or running rail in accordance with the present invention.
Figure 3:
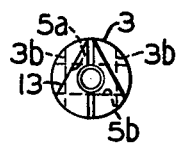
FIG. 3 is an end view of the other end of the bolt-like body member of the sensor unit of FIG. 2.

Referring now to the drawings and in particular to FIG. 1, there is shown a standard track or running rail 1 over which the flanged wheels of railway cars or vehicles travel. In practice, the track rail 1 may be located within the confines of a frictional braking apparatus or car retarder in a classification yard where the clearance or amount of available space is at a premium. As shown, the sensor or detector which is generally characterized by numeral 2 takes up a minimum amount of space and, in fact, is totally and completely located beneath the head 1a of the track rail 1. That is, the sensing or detecting unit is situated within the vertical planar limits of the head portion so that there is little, if any, possible damage and destruction by tamper apparatus during rail maintenance periods or by dragging equipment, such as, brake riggings or the like from passing vehicles.

Figure 2:
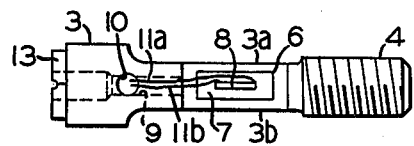
FIG. 2 is a sectional view taken along lines II—II in FIG. 1.

As shown in FIGS. 1 and 2, the detecting device includes a bolt-like or elongated cylindrical body member 3 which is constructed of a metal, such as, cold rolled steel stock which has a similar coefficient of expansion which is substantially the same as that of rail 1. It will be noted that one or inner end of the body member 3 is reduced and is provided with an external threaded portion 4. The diameter of the remainder of the body portion of bolt member 3 is progressively decreased from its other or outer end toward the threaded end. That is, a Morse No. 1, ¼ inch per foot taper, is used to provide a self-holding effect, as will be described hereinafter. In viewing FIG. 2, it will be noted that both sides 3a and 3b of the bolt-like steel body 3 are undercut or machined away to permit the top and bottom portions to more readily flex under a load. An oblong cavity 5 is machined out of the central or intermediate portion of the member 3 and is formed with an upper and a lower planar surface 5a and 5b respectively. As shown in FIGS. 1 and 2, the top planar surface has attached thereto a silicon strain gage element 6 which senses the flexure of the bolt-like member under load force. The strain gage sensing device 6 includes a rectangular epoxy glass insulative tab or chip 7 to which is bonded and sealed an elongated resistive element 8 which varies its resistance value when placed in tension. In practice, the insulative tab or glass chip 7 is cemented to the underside of the upper planar surface 5a with a suitable adhesive, such as, an anaerobic glue or cement. It will be seen that a hole 9 is drilled and extends from the outer end to the cavity 5. A communicating hole 10 is drilled from the bottom and intersects with the hole 9 to form a passageway for accommodating a pair of conductive leads 11a and 11b. As shown, the respective ends of the twisted pair of leads 11a and 11b are connected to the respective ends of the strain gage resistive element 8 and the remote ends are connected to a suitable terminal block 12. In order to protect the electrical element 8 against mechanical damage, dirt, dust, moisture and the like which is ever present in a railroad milieu, it is advisable to fill the cavity and passageway with RTV material 20, such as, silicon rubber.

It will be noted that the outer extremity of hole 9 is provided with internal threads and the outer face is provided with an indexing means in the form of an arcuate sector 13. As shown in FIG. 1, after the bolt-like sensor member 2 is totally fabricated, it is inserted into a tapered hole 14 which is drilled and reamed in the web portion of the rail 1. A washer 15 is slipped over the threaded portion 4 and a nut 16 is threaded on portion 4. The tightening of nut 16 results in the drawing up of the tapered body of sensor 2 into intimate frictional contact with the tapered hole 14 formed in web portion 1b. In practice, the bolt sensor is covered with silicone grease prior to insertion into the hole 14 to aid in the tightening to insure good metal to metal contact and to prevent corrosion.

Figure 4:
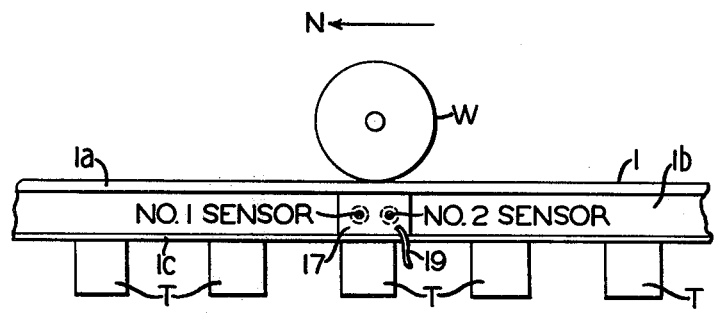
FIG. 4 is a side elevational view illustrating the disposition of a pair of strain gage sensing or detecting units in relation to a section of track rail which may be located within a frictional-gripping type of a car retarder or may be situated at a selected location along the trackway.

It will be appreciated that a pair of sensor units No. 1 and No. 2 are used at each detecting location for sensing the passing of a wheel W as shown in FIG. 4. It will be seen that the two sensing units are spaced apart by several inches in the web portion of running rail 1 which is directly mounted on crossties T in open territory or upon supporting stands or chairs (not shown) in a retarder installation as is well known. Thus, after the disposition and fixation of both of the sensors, a metallic cover plate 17 is situated between the rail head 1a and flange 1c to protect the sensors from adverse climatic conditions. As shown in FIG. 1, the cover plate 17 is fixedly attached in place by a pair of screws (one of which is shown by character 18) which are inserted into the internal or female threads formed in the outer extemity of each of sensor units 2. The cover 17 is provided with cut-out portions 13 which match the sector portions 13 formed on the outer ends of the bolt members 2. It will be noted that the terminal block 12 is secured to the inside of cover 17 by suitable screws or the like (not shown) and a heavy duty four-lead cable 19 extending from the terminal block 12 to a wayside location which houses the complementary electronic circuitry.

Figure 5:
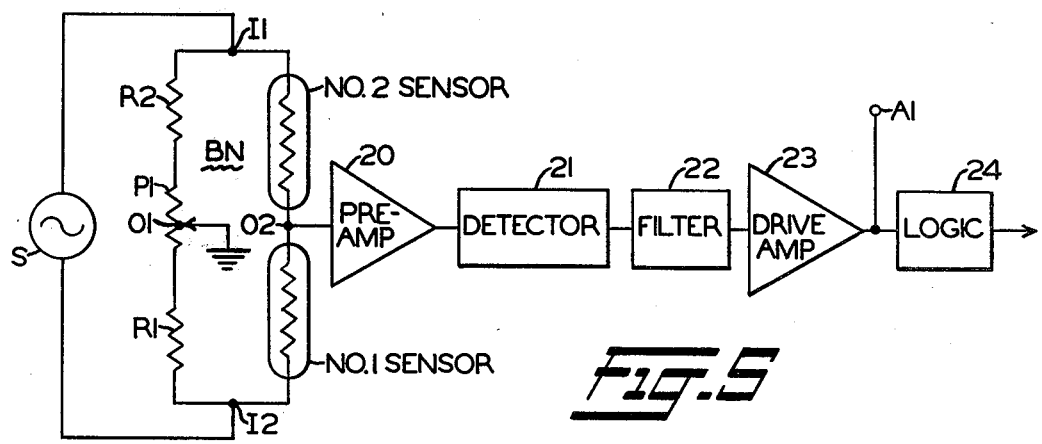
FIG 5 is a schematic circuit diagram of an electronic circuit which may be utilized in conjunction with the sensing units to detect the presence of the wheels of railway vehicles.
Figure 6A:
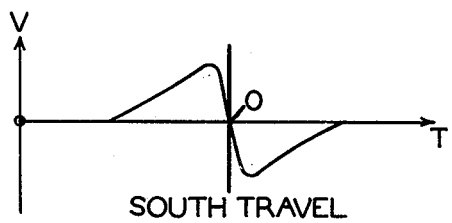
FIGS. 6A and 6B are illustrated graphs of the signal waveforms which are produced by the passing vehicle wheel as it moves in a different direction along the track rail.
Figure 6B:
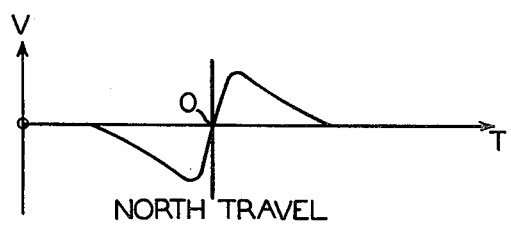

Turning now to FIG. 5, there is shown the schematic circuit which is operative in response to the passing wheel W of a railway vehicle to provide either the waveform as shown in FIG. 6A or the waveform as shown in FIG. 6B. As shown, the No. 1 and No. 2 sensors form two arms of a balanced bridge network BN. The other two arms of the bridge BW consists of two fixed resistors R1 and R2 and an offset or fine adjusting potentiometer P1 interconnecting the latter two arms to ground which forms one of the output terminals O1. The input terminals I1 and I2 of the resistive bridge network BN are connected to a source S of R.F. power signals. The other output terminal O2 which is formed between the common ends of resistance element sensors No. 1 and No. 2 is connected to the input of preamplifier 20. Initially, the bridge is unbalanced manually by the adjustment of the movable wiper or sliding tap so that some R. F. signal is developed across the output terminals. The output from preamplifier circuit 20 is connected to the input of detector circuit 21 whose output is connected to the input of filter circuit 22. The output of filter 22 is connected to driver amplifier 23 and then to the input of the logic circuit 24. The output of driver amplifier 23 is also connected to the analog output signal terminal A1 which may be connected to an appropriate amplitude measuring device (not shown).

Let us now assume that the trackway lies in a North and South direction and that North is in the direction as indicated by the arrow in FIG. 4. Now, assume that a vehicle approaches the detection location from the North so the front wheel first passes over the No. 1 sensor and then passes over the No. 2 sensor as it travels along its route of travel. As the wheel W approaches the No. 1 sensor, the weight or load of the railway vehicle causes a compressive force to be imparted to the rail. The force is transmitted from the head through the web portion and results in a compression of the rail in the area of the hole 14 which, in turn, causes a bending of upper and lower surfaces 5a and 5b. The deflection of the upper surface 5a results in the bending and longitudinal stressing of the strain gage element 8 and causes an increase in the resistance of the No. 1 sensor. The resistive change in strain gage element 7 causes an unbalancing of the bridge BN and results in the amplitude modulation of the R. F. signals from source S. That is, as the wheel W approaches sensor No. 1, the amplitude of the signal on terminal O2 gradually rises or increases until a maximum value is reached when the wheel is directly over the No. 1 sensor. As the wheel recedes from the No. 1 sensor, the amplitude begins to sharply decrease until the steady state value is reached at a point when the wheel W is exactly equi-distance between the two sensors. Now, as the wheel W approaches the No. 2 sensor, the amplitude of the signal rapidly decreases and nulls when the wheel W is directly above the No. 2 sensor. As the wheel W moves away from the No. 2 sensor, the amplitude gradually increases toward a steady state value. The amplitude modulated R. F. signals appearing across terminals O1 and O2 are amplified by the pre-amplifier circuit 20. The amplified signals are fed to the detecting circuit 21 where demodulation occurs to remove the R. F. carrier. The demodulated signal is passed through filter 21 and, in turn, is applied to the input of the power or drive amplifier 23. A signal having a waveform as shown in FIG. 6A is developed on the output terminal A1 and is also fed to the input of the logic network 24 for processing and subsequent usage. Thus, the Southbound wheel W is readily detected and the transition at point O accurately represents the midway position of the passing wheel on the rail 1 at the detection location.

Similarly, if a Northbound railway vehicle is traveling along the trackway, a resultant curve as represented by the waveform of FIG. 6B will be produced as the wheel W first incurs the No. 2 sensor and then passes over the No. 1 sensor. Thus, it will be seen that the exact moment that the wheel W passes the midpoint between the two sensors can be readily ascertained by the zero transition of the waveform of FIG. 6B. After preamplification, detection and filtering, the output signals are applied to the input of driver amplifier 23. The logic circuitry 24 may include suitable counters and storage circuits for counting and storing the number of wheels passing the detection location and may also include directional sensing circuits for determining the direction of movement of the railway vehicles passed the sensors. The logic may also include circuitry for timing the distance between the peaks, namely, the time elapsed between peaks, of the waveforms of FIGS. 6A and 6B to determine the speed of the railway vehicle. The analog output terminal may be connected to an amplitude measuring apparatus to determine the weight sustained by each axle of the railway vehicles.

It will be understood that while the invention finds particular utility in a wheel detecting arrangement for railway vehicle wheels in a car retarder installation, it is readily evident that the presently disclosed strain gage wheel sensors may be employed in other areas along the trackway. For example, the sensors may be disposed at the entrance end and/or exit end of the classification yard to detect incoming and outgoing trains and may likewise be used in a check-in/check-out train detection system. Further, it will be apparent that various changes and modifications may be made to the presently described invention by those skilled in the art and, therefore, it is understood that all alterations, ramifications and equivalents which are within the spirit and scope of the invention are herein meant to be included in the appended claims.

Having now described the invention, what I claim as new and desire to secure by Letters Patent, is:

1. A detecting device for sensing passing wheels of railway vehicles comprising, a bolt-like member having a cavity formed therein, a strain gage member located within said cavity, a track rail for supporting the passing wheels of the railway vehicles, said bolt-like member is tapered and is threaded at one end to be fitted into an aperture formed in said track rail and is secured to said track rail by a nut whereby said strain gage member detects the stress which is imparted to the track rail under the load of the wheels of the railway vehicles.

2. The detecting device as defined in claim 1, wherein the longitudinal axis of said bolt-like member is perpendicular to the longitudinal axis of said track rail.

3. The detecting device as defined in claim 1, wherein said cavity is elongated along the longitudinal axis of said bolt-like member and includes an upper planar surface to which said strain gage member is attached.

4. The detecting device as defined in claim 1, wherein said bolt-like member includes an indexing means for ascertaining the top and bottom of said cavity.

5. The detecting device as defined in claim 4, wherein said indexing means is situated at one end of said bolt-like member and cooperates with a protective cover member which is attached thereto.

6. The detecting device as defined in claim 1, wherein said strain gage member takes the form of a resistance element bonded to an insulation tab member which is cemented to a flat surface of said cavity.

7. The detecting device as defined in claim 1, wherein said bolt-like member includes a passageway extending from said cavity for accommodating a pair of conductive leads which are connected to said strain gage member.

8. The detecting device as defined in claim 1, wherein said bolt-like member is fitted into a tapered aperture formed in the neutral axis in the web of said track rail.

9. The detecting device as defined in claim 8, wherein said bolt-like member is situated under the head of the track rail to prevent damage and destruction by tamping and dragging equipment.

10. A railway car wheel sensing arrangement comprising a pair of wheel sensors spaced apart and mounted in respective holes formed in the web of a track rail, each of said pair of wheel sensors including an internally mounted strain gage element for detecting the deflection of the track rail when a wheel of a railway car passes over the respective sensor, a bridge network having a pair of input and output terminals, a source of a.c. signals connectable to said input terminals, each of said strain gage elements forming a respective resistance leg of a bridge network which results in a change in resistance and causes an unbalancing of said bridge network when the strain gage element is placed in tension by the deflection of the track rail so that amplitude modulation of the a.c. signals is developed across said pair of output terminals.

* * * * *